H. B. SYLER.
SPRING SUSPENSION FOR AUTOMOBILES AND OTHER VEHICLES.
APPLICATION FILED JUNE 3, 1920.

1,398,812.  Patented Nov. 29, 1921.
2 SHEETS—SHEET 1.

Inventor
Harry Blaine Syler.
By Lancaster and Allwine
his Attorneys

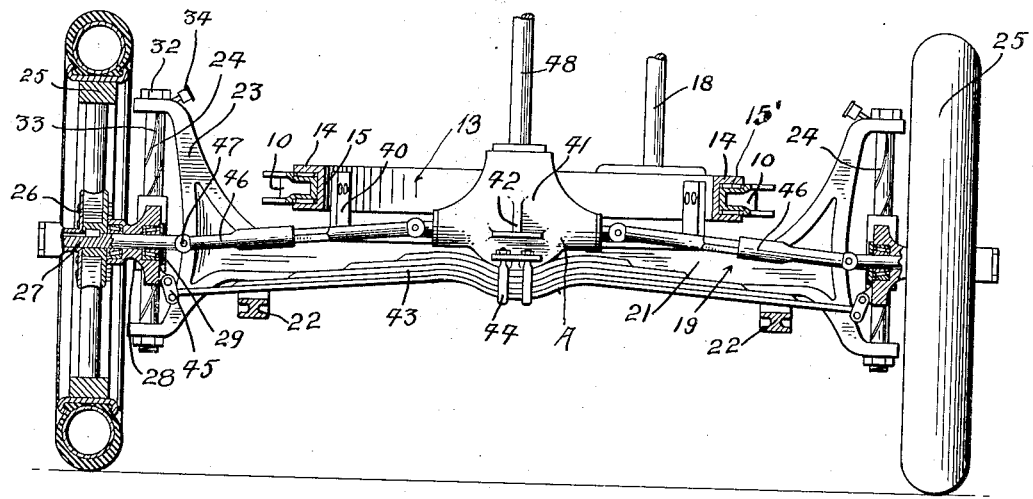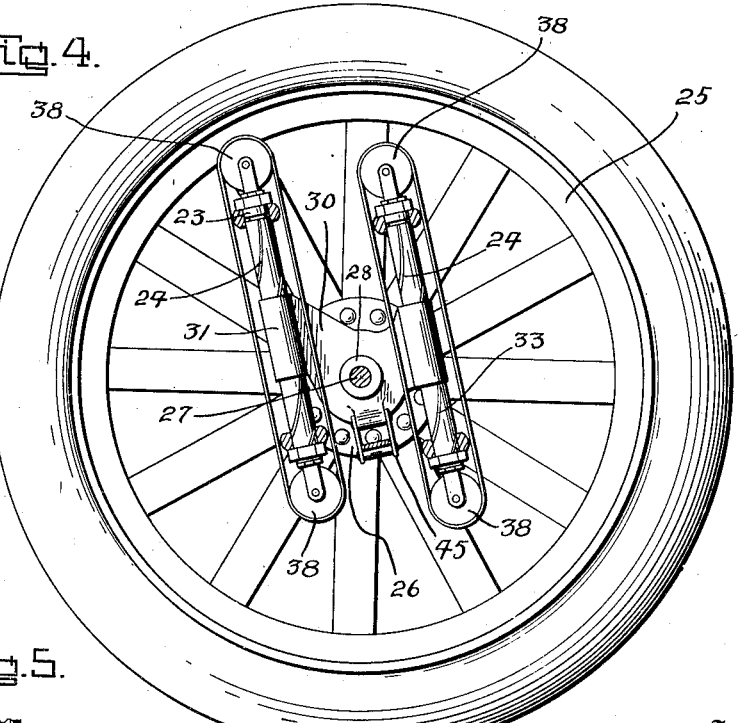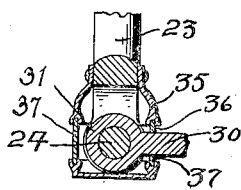

UNITED STATES PATENT OFFICE.

HARRY B. SYLER, OF NORTON, KANSAS.

SPRING SUSPENSION FOR AUTOMOBILES AND OTHER VEHICLES.

1,398,812.        Specification of Letters Patent.    Patented Nov. 29, 1921.

Application filed June 3, 1920. Serial No. 386,331.

*To all whom it may concern:*

Be it known that I, HARRY B. SYLER, a citizen of the United States, residing at Norton, in the county of Norton and State of Kansas, have invented certain new and useful Improvements in Spring Suspensions for Automobiles and other Vehicles, of which the following is a specification.

This invention relates to vehicles, and the primary object of the invention is to provide an improved spring suspension for motor vehicles which will permit of the independent movement of each wheel without any corresponding movement of the opposite wheel on the chassis frame, and thus insure the easy riding of the vehicle and the prevention of the transmission of any shock to the vehicle body incident to the travel of the vehicle over rough roads.

Another object of the invention is to provide an improved means for incorporating the improved spring suspension in a front wheel drive for motor vehicles, although it is to be understood that the same could be effectively used in a rear wheel drive or a four wheel drive.

A further object of the invention is the provision of an improved spring suspension embodying a dead axle having forked terminals, wheeled hubs slidably carried by the forked terminals for independent movement, and a transverse supporting spring carried at its central portion by the chassis and having its terminals connected to the hubs.

A still further object of the invention is to provide an improved means for driving the wheels and still permit of the independent movement thereof, means also being provided for permitting of the swinging of the dead axle for the steering of the vehicle.

A still further object of the invention is the provision of an improved means for effectively eliminating the entrance of dust, dirt and the like into the axle spindle and the sliding connection between the wheeled hub and the fork of the dead axle.

With these and other objects in view, the invention consists in the novel construction, arrangement and formation of parts as will be hereinafter more specifically described, claimed and illustrated in the accompanying drawings, forming a part of this specification, in which drawings:

Figure 1:
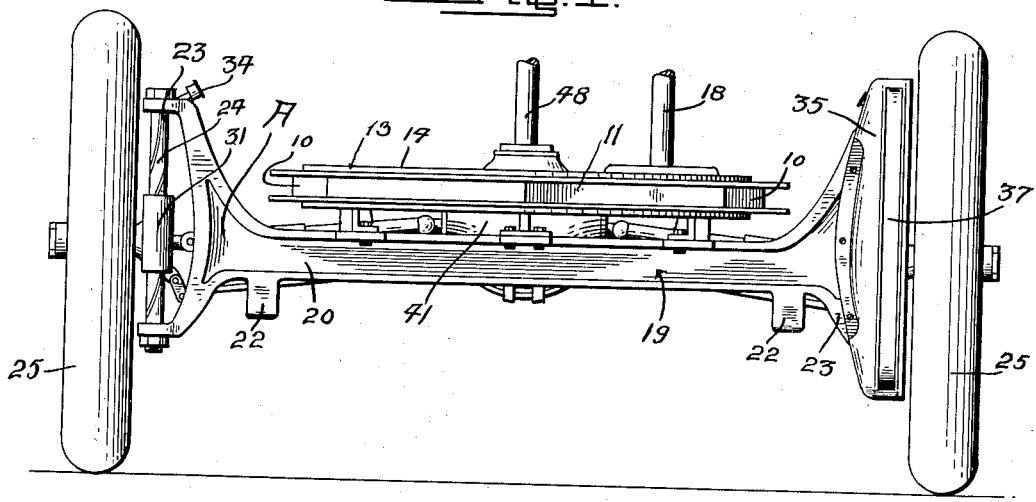
Figure 1 is a front elevation of a chassis showing the improved spring suspension embodied therein, one terminal of the dead axle being shown without the inclosing housing so as to facilitate the understanding thereof.

Fig. 3 is a transverse sectional view through the chassis illustrating the spring suspension, the dust protecting housings being shown removed, Fig. 4 is a vertical section through the chassis showing one of the wheels in elevation and illustrating the means for slidably connecting the same with the forked terminal of the dead axle, and Fig. 5 is a detail horizontal section through the connecting portion of the hub of the wheel and the forked terminal of the axle, showing means for mounting the protecting housing thereon.

Referring to the drawings in detail, wherein similar reference characters designate corresponding parts throughout the several views, the letter A indicates a motor vehicle chassis which is constructed in accordance with this invention. Only the forward end of the chassis has been illustrated and a front wheel drive has been incorporated therein, but it is to be understood that the invention can be readily used for wheels of the non-drive type by simply eliminating the driving connection.

The chassis as shown includes the side channel beams 10 and the front channel beam 11. The side channel beams 10 are also connected adjacent to the forward ends of the frame by transverse channel beam 12 and the forward channel beam 11 and the channel beam 12 are so shaped as to form in connection with the side channel beams 10 a housing for the annular rotatable table 13 which forms a fifth wheel for the chassis. This table 13 includes the upper and lower concentric rings 14 which engage respectively the upper and lower surfaces of the side beams 10 and the transverse beams 11 and 12, and these rings are connected together by an inner connecting wall 15. Suitable conical bearings 15' can be interposed between the table 13 and the beams 10, 11 and 12. The outer surface of the uppermost ring 14 is provided with gear teeth 16 and these teeth have meshing therewith a relatively small gear 17, which is keyed to the steering post 18 of the vehicle. Thus it can be seen that upon movement of the steering post the table 13 will be rotated on the side channel beams 10 and the transverse channel beams 11 and 12.

Figure 2:
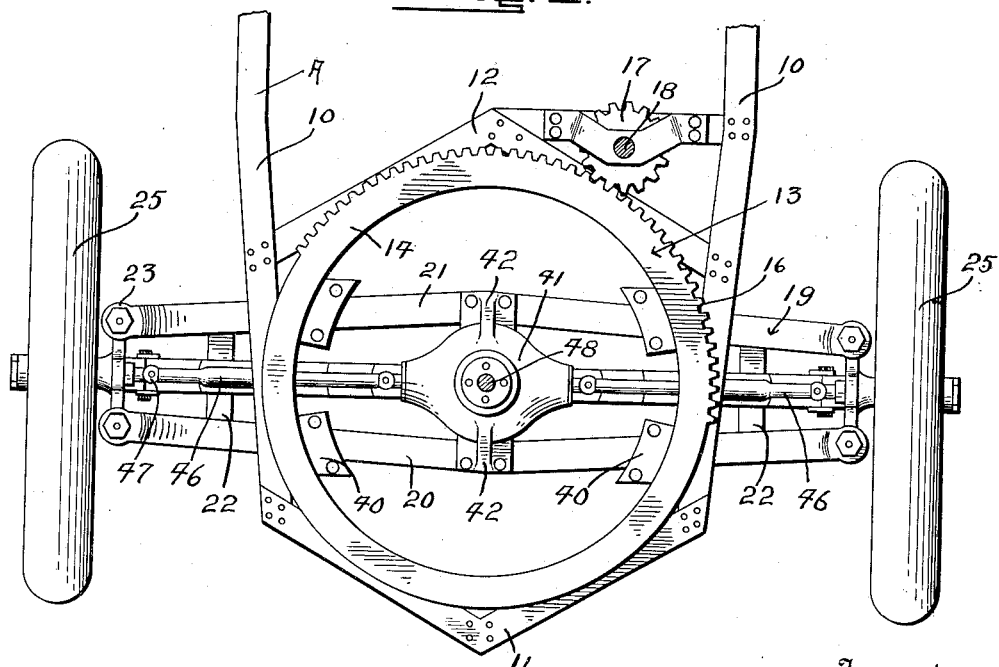
Fig. 2 is a fragmentary plan view of a chassis showing the improved spring suspension embodied therein, parts being shown in section.

The axle construction designated by the numeral 19 is of novel form and is so arranged as to give added strength and durability to the chassis. The dead axle construction as shown includes the front and rear bars 20 and 21, and these bars are slightly converged toward their outer ends as clearly shown in Fig. 2 of the drawings. The bars 20 and 21 are connected adjacent to their terminals by means of U-shaped clamping members 22 which may be of I-beam construction if so desired. Each terminal of the bars 20 and 21 is forked, as at 23 and these forked terminals support the rods 24, which are adapted to carry the supporting or drive wheels 25. The supporting or drive wheels 25 are of the usual or any preferred construction and include the hub 26 which is keyed or otherwise secured to the spindles 27. These spindles 27 are rotatably mounted in bearing sleeves 28 which are provided with suitable roller bearings or the like 29. The inner terminals of the bearing sleeves 28 are provided with outwardly extending arms 30 which terminate in collars 31, which are slidably mounted on the rods 24. These rods 24 are preferably inclined to the perpendicular so that the wheels will have a forward and downward motion or a rearward and upward motion and thereby lessen the transmission of shock to the dead axle. The rods 24 are secured in place by a suitable retaining nut 32 and the rods are provided with spiral oil ways 33 which communicate with oil holes which receive the oil cups 34.

To prevent the entrance of dirt or the like to the rods 24 elongated casings 35 are provided for housing the same, and these casings are bolted or otherwise secured to the axle fork. The sides of the casings 35 are provided with longitudinally extending slots 36, the walls of which are provided with grooves for slidably receiving the endless belts 37. These belts 37 are trained around suitable guide rollers 38 carried by the outer terminals of the rods 24. The belts 37 are slotted, so as to permit the arms 30 of the bearing sleeves 28 to extend therethrough, and it can be seen that as the wheels 25 ride up and down, the belts 37 will be moved therewith. This provides an effective means for inclosing the rods 24 at all times.

The frame is bolted or otherwise secured to the dead axles 19 by means of brackets 40, so that independent movement of the axles is prevented. The central portion of the bars 20 and 21 forming the axle 19 supports the differential housing 41 and the differential housing carries outwardly extending lugs 42 which are bolted or otherwise secured to the upper surface of the bars 20 and 21.

A transversely extending built up leaf spring 43 is provided for supporting the bearing sleeves 28 and the central portion of this spring is bolted or otherwise secured as at 44 to the differential housing 41, although it is to be understood that the central portion of the spring can be secured in any preferred manner to the central portion of the bars 20 and 21 forming the dead axle. The terminals of the spring 43 are secured by means of the usual shackles 45 to the bearing sleeve 28. Thus it can be seen that when one of the wheels rides into an uneven place in the road, the same is free to move up and down and the spring 43 will effectively absorb the shock transmitted thereto.

The power is transmitted from the differential through the drive shaftings 46 and the wheel spindle 27. The drive shaftings 46 consists of telescoping units which are connected by universal joints 47 with the differential and wheel axle spindle. The differential gearing may be connected with a drive motor in any preferred manner and as shown a vertically disposed drive shaft 48 is provided which is particularly adapted for vehicles utilizing steam engines as their motive power such as Stanley steamers and the like.

From the foregoing description it can be seen that an improved means has been provided for effectively permitting independent movement of each wheel which is so constructed as to permit the vehicle frame to be hung low so as to give a lower center of gravity and thus eliminate side sway and skidding. This construction also permits easy steering and short turns.

Changes in details may be made, without departing from the spirit or scope of this invention; but,

I claim:

1. In a vehicle, an axle having forked terminals, rods carried by the forked terminals, collars slidably mounted on the rods, outwardly extending wheeled spindles carried by the collars, wheels carried by the spindles, a transversely extending leaf spring secured at its central portion to the axle, and means connecting the terminals of the spring with the sliding collar.

2. In a vehicle, an axle including front and rear bars, means connecting the bars together, forked ends formed on said bars, rods carried by the forked ends, said rods having oil ways therein, a bearing, collars carried by said bearing slidably mounted on the rods, means for feeding oil into said oil ways, a dust guard for the rod and collars, axle spindles carried by said bearings, wheels carried by said spindles, and means for driving said spindles.

3. In a vehicle, a frame, a dead axle carried by the frame, differential gearing carried by the central portion of the axle, a housing for said differential gearing, inclined rods carried by the axle ends, collars slidably mounted on said rods, outwardly extending bearings carried by said collars, spindles rotatably mounted in said bearings, wheels secured to said spindles, telescopic Cardan shafts connecting said spindles with said differential gearing, and spring means connecting the differential housing with said sliding bearings.

4. In a vehicle, side bars, transversely extending oppositely disposed substantially V-shaped transverse bars connecting said side bars, a rotatable table including upper and lower rings arranged to engage the upper and lower surfaces of said side bars and transverse bars, conical bearings interposed between the bars and the rotatable table, means connecting the rotatable table with a steering gear, a dead axle, brackets connecting the dead axle with the rotatable table, forked terminals formed on the axle ends, rods carried by the forked terminals, collars slidably mounted on the rods, outwardly extending bearings carried by said collars, spindles rotatably mounted in said bearings, wheels keyed to said spindles, differential gearing carried by said axle, telescopic Cardan shafts connecting the differential gearing with the spindles, and means for preventing the entrance of dust to said rods and sliding collars.

5. In a vehicle, an axle having a forked terminal, a rod carried by said forked terminal, a collar slidably mounted on said rod, a bearing carried by said collar, a casing carried by said forked terminal and inclosing said rod and collar, the opposite end walls of said casing having slots formed therein, the longitudinally extending walls of said slots having grooves formed therein, rollers carried by the opposite terminals of the rods, and a flexible dust band trained around said rollers and having its side edges slidably mounted in said grooves.

6. In a vehicle, an axle including a pair of spaced bars, means connecting the bars together, forked terminals formed on the bars, rods carried by the forked terminals, bearings, outwardly extending arms carried by said bearings, collars carried by the terminals of the arms and slidably mounted on said rods, rollers rotatably carried by the terminals of the rods, dust bands trained around said rollers, housings carried by the forked terminals and inclosing said rods and collars, the sides of said housings having slots formed therein for the reception of said dust bands, said dust bands also having slots formed therein for the reception of said arms.

HARRY B. SYLER.